Figure 1:
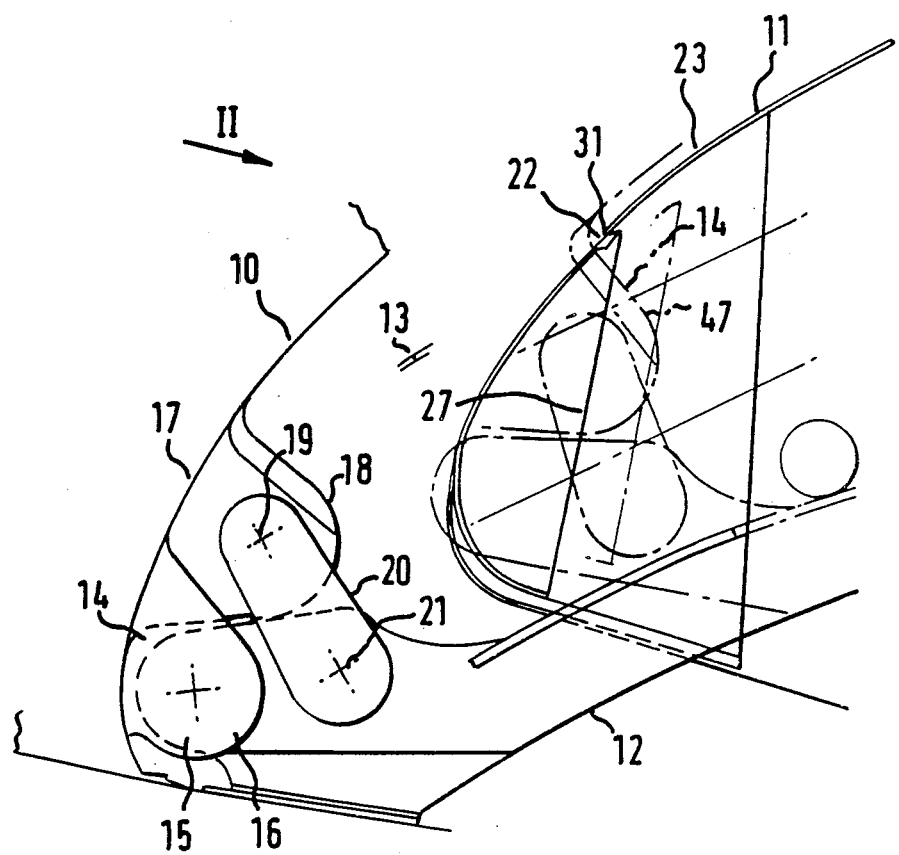

United States Patent [19]

Britton

[11] Patent Number: 4,848,707

[45] Date of Patent: Jul. 18, 1989

[54] WING LEADING EDGE ARRANGEMENTS FOR AIRCRAFT

[75] Inventor: John R. Britton, Bristol, United Kingdom

[73] Assignee: British Aerospace Plc., London, England

[21] Appl. No.: 282,503

[22] Filed: Dec. 12, 1988

[30] Foreign Application Priority Data

Dec. 19, 1987 [GB] United Kingdom ................. 8729655

[51] Int. Cl.$^4$ ........................... B64C 3/50; B64C 1/38
[52] U.S. Cl. .................................... 244/214; 244/130
[58] Field of Search ............. 244/213, 214, 215, 216, 244/210, 211, 219, 130, 129.4; 89/371.19, 37.21, 1.817

[56] References Cited

U.S. PATENT DOCUMENTS

| | | | |
|---|---|---|---|
| 2,381,679 | 8/1945 | Maxwell | 244/211 |
| 3,263,945 | 8/1966 | Wimpenny | 244/214 |
| 3,968,946 | 7/1976 | Cole | 244/214 |
| 4,131,252 | 12/1978 | Dear et al. | 244/215 |
| 4,360,176 | 11/1982 | Brown | 244/214 |
| 4,640,477 | 2/1987 | Pace | 244/214 |

Primary Examiner—Galen L. Barefoot

Attorney, Agent, or Firm—Kerkam, Stowell, Kondracki & Clarke

[57] ABSTRACT

The invention concerns a wing leading edge arrangement for aircraft in which a slat 10 is provided forwardly of a fixed leading edge 11 and is movable between a retracted configuration in which it lies closely adjacent the fixed leading edge 11 and a deployed configuration in which it is spaced from the fixed leading edge 11 to define a slot 13. The slat 10 includes attachment means 14 to two chordwise extending support tracks 12 slidably mounted on the leading edge 11. An aperture 22 in the leading edge skin 23 accommodates the attachment means 14 when the slat 10 is retracted. A shutter arrangement 27 mounted within the fixed leading edge is movable between an aperture closing position when the slat is deployed and a retracted position when the slat is stowed. The shutter arrangement 27 includes a pair of shutter doors 27A, 27B having surface profiles generally conforming to the profile of the fixed leading edge 11 and being sized, in totality, so as to be capable wholly to close the aperture 22; parallel motion linkage (34–37, 42) mounted in the leading edge and connected to the shutter doors; and springs 45 for urging the shutter doors 27A, 27B to move between retracted and deployed positions.

5 Claims, 4 Drawing Sheets

WING LEADING EDGE ARRANGEMENTS FOR AIRCRAFT

This invention relates to leading edge arrangements for aircraft in which a slat is provided forwardly of a fixed wing portion and is movable between a cruise configuration in which it lies adjacent the fixed wing portion and a high lift configuration in which is is spaced from the wing to define a slot.

Various arrangements are known for supporting the slat and controlling its attitude over its operating range of movement. These generally comprise support tracks secured to the slat at or about their forward extremities and which are slidably mounted with respect to the fixed wing portion. They may be of circular arc form such that the path followed by the slat is by definition a circular arc or alternatively, they may configured such that the slat can adopt optimised attitudes at selected angles of deployment in accordance with specific flight modes, e.g. cruise take-off and landing. In any event, each spanwise section of slat is supported on two or more support tracks generally by means of a structural bolted attachment extending as a "knuckle" from the rearward face of the slat. This "knuckle" may further include slat adjustment means whereby the slat may be properly rigged to ensure that it achieves a smooth upper surface continuity with the fixed wing when in its stowed position.

In its stowed position, the trailing surface region of the slat, which is of generally concave form, lies in close proximity to the fixed wing leading edge portion of generally convex form and this fixed wing leading edge portion must be apertured to accommodate not only the support track but also the knuckle assembly. This may result in a significantly sized aperture which is an undesirable feature when the slat is deployed since it may induce undesirable flow disturbance in the slot formed between the slat and the fixed leading edge portion U.S. Pat. No. 4,640,477 discloses one arrangement for closing off such an aperture and comprises a door which is mounted about an axis of rotation that is positioned in a vertical plane generally parallel to the movement of the track. The axis of rotation is slanted such that the door moves upwardly, rearwardly and laterally to its retracted position so as to permit the track to be retracted and, when the track is extended, a spring moves the door into its deployed position to close the opening. In this prior art arrangement the door is pivotally located adjacent the inner surface of the wing fixed leading edge structure and is arranged such that the door is angularly displaced about a single axis of rotation. In other words, it acts as a conventional hinged door and the door moves into either its deployed or retracted condition as a function of track movement. Slat deployment is associated with a forwardly and downwardly movement of the track enabling the door to be urged, by the spring, into its deployed position. On retraction of the slat, the upper surface of the track engages the door which is angularly displaced into its retracted position. The door of this mechanism, being hinged on one side, sweeps a large volume of the free space within the aerofoil during its movement: in many cases such a large volume is simply not available. The present invention seeks to reduce the above disadvantages of known structures.

According to the present invention there is provided a wing leading edge arrangement for aircraft in which a slat is provided forwardly of a fixed leading edge and movable between a retracted configuration in which it lies closely adjacent the fixed leading edge and a deployed configuration in which it is spaced from the fixed leading edge to define a slot, said slat including:

attachment means to at least two substantially chordwise extending support tracks slidably mounted upon said leading edge portion to define said slat movement; an aperture in the leading edge skin of said fixed leading edge to accommodate said slat attachment means when said slat is in its retracted configuration; aperture closing means mounted within said fixed leading edge and movable between an aperture closing position when said slat is in its deployed configuration and a retracted position when the slat is in its stowed configuration; said aperture closing means comprising:

(a) a pair of shutters having surface profiles generally conforming to the fixed leading edge profile and having, in combination, a surface area sized to close off said aperture, (b) parallel motion linkage means mounted in said leading edge and to which said shutters are attached; and (c) means for urging said shutters to move between said retracted and deployed positions.

Figure 2:
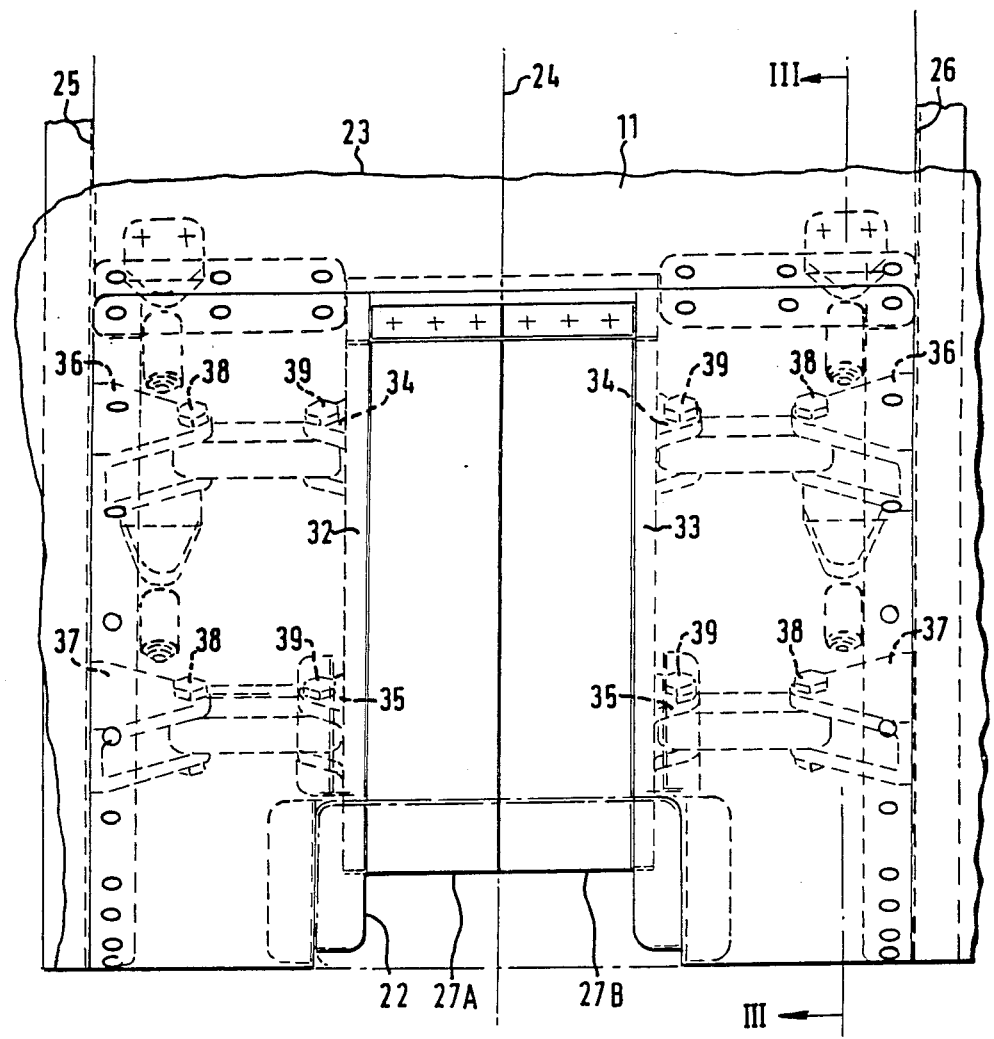
Figure 3:
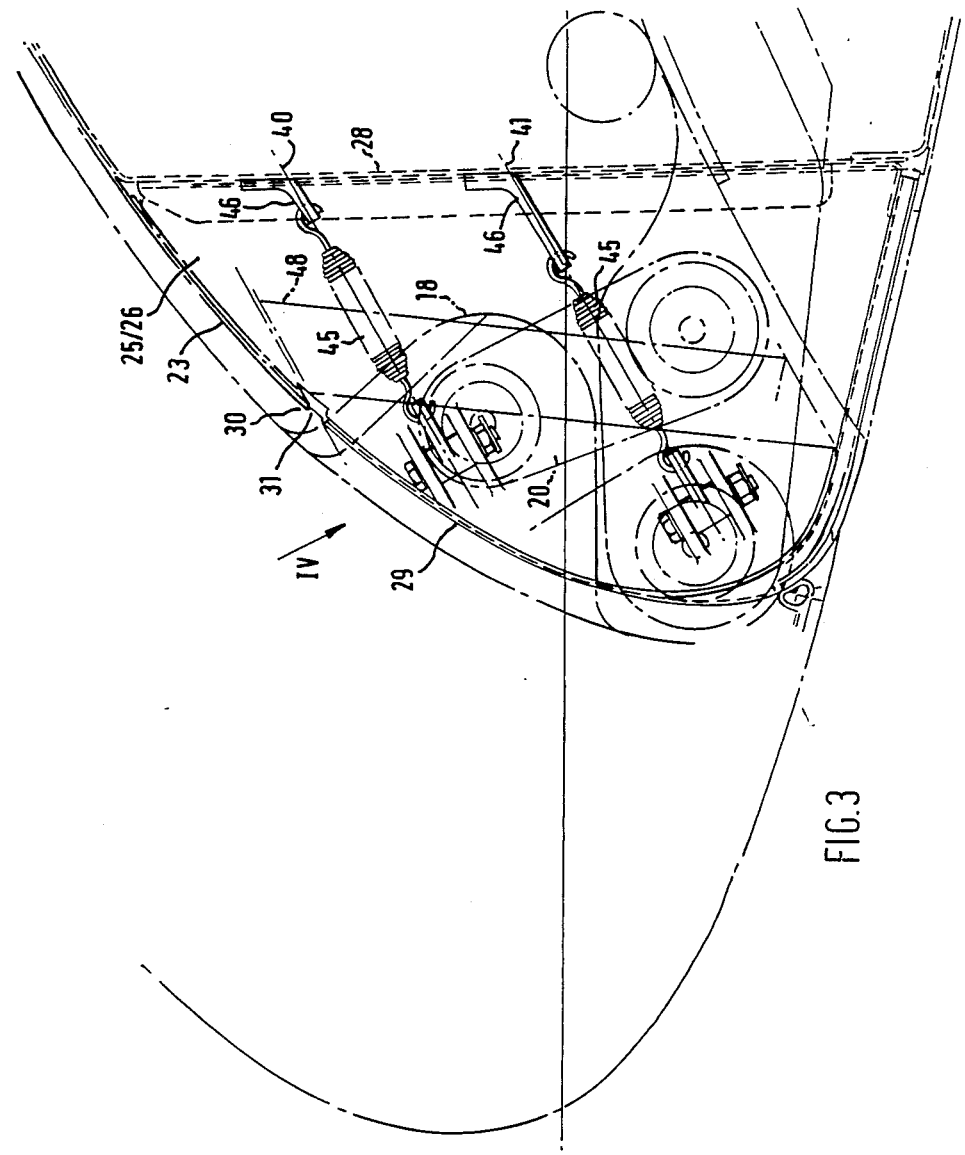
Figure 4:
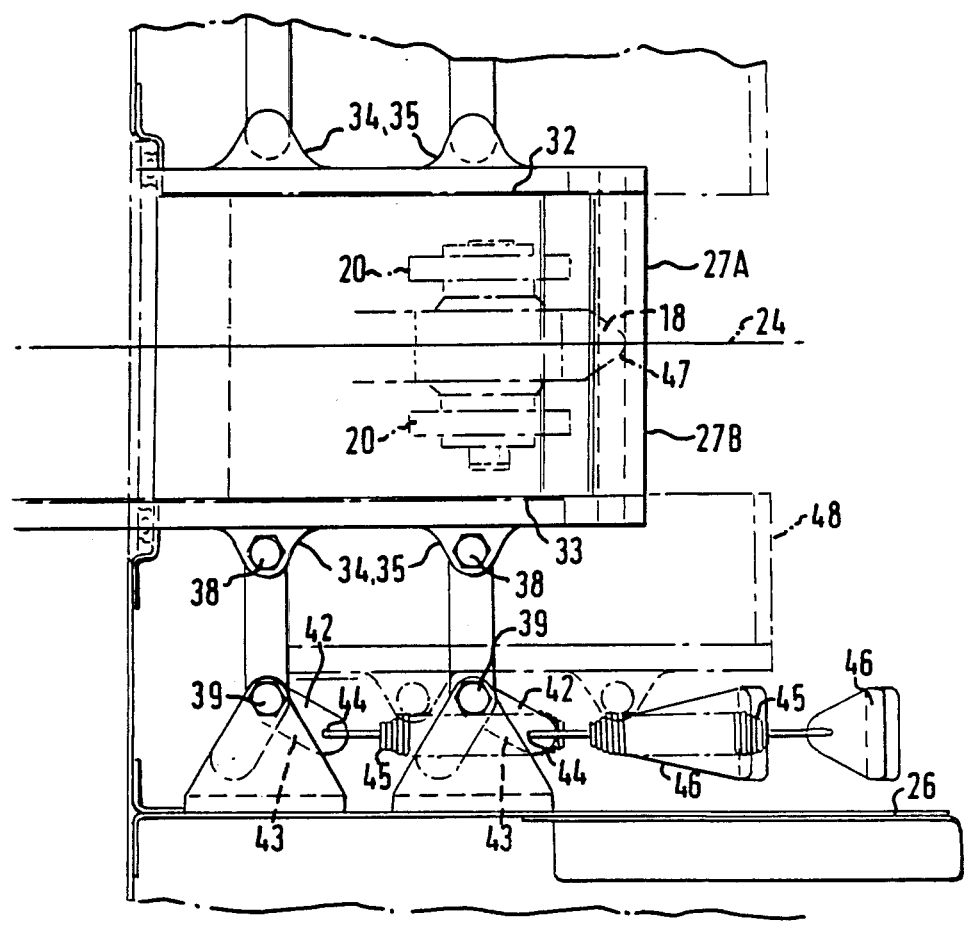

One embodiment of the invention will now be described, by way of example only, by reference to the accompanying drawings in which:

FIG. 1 illustrates, diagrammatically, a portion of a leading edge slat arrangement with the slat in deployed position with respect to the wing, FIG. 2 is a front elevation on the wing fixed leading edge at typical slat support position, viewed in direction of arrow II in FIG. 1, FIG. 3 is a sectional view through the wing fixed leading edge at the same slat support position viewed along a line III—III in FIG. 2, and FIG. 4 is a view on the fixed leading edge in direction of arrow IV in FIG. 3.

Referring to the drawings FIG. 1 illustrates a portion of a leading edge slat 10 supported upon a fixed wing leading edge portion 11 by means of two or more substantially chordwise arcuate support tracks 12 and by which means the slat 10 is movable from a stowed position where it lies closely adjacent the fixed leading edge to conform to the wing aerodynamic profile in well known form, (not illustrated here) to a deployed high-lift position as shown, where it is placed to define a slot 13.

The slat 10 is supported on the track 12 by means of a knuckle joint assembly 14. The forward extremity of the slat track 12 is configured as shown to provide a pivotal attachment 15 to a fork end fitting 16 protruding rearwardly from the slat inner profile 17. The slat further incorporates a lug 18, also protruding rearwardly from the slat inner profile 17, and providing a pivotal attachment 19 to a pair of adjuster links 20. The lower end of these links 20 incorporate a pivotal attachment 21 to the track 12. This arrangement is particularly configured to provide, in addition to slat attachment, adjustment means for rigging the slat correctly with respect to the wing profile when the slat is in its retracted configuration.

The detailed arrangement of this knuckle adjuster assembly is not described in detail here but it will be seen that, with the slat 10 closed, the knuckle assembly 14 will project into the wing fixed leading edge structure necessitating an appropriately sized aperture 22 in the leading edge skin 23. As previously discussed, the aperture may be of significant size resulting, when the slat is deployed, in undesirable flow disturbance in the slot 13 formed between the slat and the fixed leading edge portion.

To overcome this problem, the present invention provides a deployable leading edge shutter arrangement 27 which automatically closes off the aperture when the slat 10 is deployed but is retracted by means of the knuckle assembly 14 engaging the shutters as the slat is retracted. This is illustrated in detail by reference to FIGS. 2-4 inclusive.

FIGS. 2 and 3 illustrate a wing leading edge structural arrangement at a typical slat attachment position and the centre line 24 shown on FIG. 2 corresponds to that of the slat track 12 and the knuckle assembly 14. The leading structural arrangement and the shutter arrangement are symmetrically disposed about the centre line 24. The structure comprises a pair of leading edge riblets 25 and 26 lying forwardly of a wing subspar 28.

The shutter assembly 27 comprises a pair of "handed" shutter doors 27A and 27B having a surface profile 29 conforming to the inner profile of the wing leading edge skin 23. The upper edge of the shutter doors 27A and 27B each includes a trailing edge member 30 of extruded form for engaging the upper edge 31 of the aperture 22, and outer side webs 32 and 33. The outer side webs 32 and 33 incorporate on their outer surfaces upper and lower fork fittings 34 and 35 respectively and the wing riblets 25 and 26 include, on their inner surfaces, inwardly facing upper and lower fork fittings 36 and 37 respectively. Interconnecting bell-crank levers 42 include a pivotal attachment 38 to the fittings 36 and 37 and pivotal attachments 39 to the fittings 34 and 35.

The fork fittings 34, 35, 36 and 37 and the bell-crank levers 42 lie along common and parallel axes 40 and 41 which consequently define the axis of rotation of the shutters such that the shutters are constrained to move generally parallel to the movement of the track 12. The diagonally disposed leg 43 of the bell-crank levers 42 provides an attachment hole 44 for engaging upper and lower tension springs 45 which are anchored to attachment brackets 46 mounted to the forward face of the subspar 28. The springs 45 and the brackets 46 similarly lie generally along the parallel axes 40 and 41.

In operation, with the slat deployed, the aperture 22 is closed off by the shutter doors 27A and 27B urged into springloaded closing engagement with the wing leading edge, and lying substantially in abutment along the centre line 24. On retraction of the slat, the rearward edge 47 of the lug 18 which is conveniently shaped to provide a lead-in, gradually comes into contact with the shutter doors 27A and 27B applying an opening force against the installed spring force. This induces parallel motion in the shutter mechanism with a resultant displacement in the shutter doors in an upwardly and rearwardly direction until the doors assume a final stowed location 48 to each side and nominally in line with the side boundaries of the aperture, the slat continuing to lie substantially parallel to the centre line 24.

I claim:

1. A wing leading edge arrangement for aircraft in which a slat is provided forwardly of a fixed leading edge and is movable between a retracted configuration in which it lies closely adjacent the fixed leading edge and a deployed configuration in which it is spaced from the fixed leading edge to define a slot, said slat including:
    attachment means to at least two substantially chordwise support tracks slidably mounted on said leading edge to define said slat movement; an aperture in the leading edge skin of said fixed leading edge to accommodate said slat attachment means when said slat is in its retracted configuration; aperture closing means mounted within said fixed leading edge and movable between an aperture closing position when said slat is in its deployed configuration and a retracted position when the slat is in its stowed configuration;
    the improvement consisting in that said aperture closing means includes:
    (a) at least one pair of shutters having surface profiles generally conforming to the fixed leading edge profile and having, in combination, a surface area sized to close off said aperture,
    (b) parallel motion linkage means mounted in said leading edge and to which said shutters are attached; and
    (c) means for urging said shutters to move between said retracted and deployed positions.

2. A wing leading edge arrangement according to claim 1 in which said shutters, in their deployed position, are in edgewise abutment along adjacent longitudinal edges and the abutment line lies substantially in alignment with said attachment means, the arrangement being such that as the slat moves from its deployed configuration to its retracted configuration, said attachment means, having a contact portion for engaging said shutters, moves said shutters in parallel motion such that when the slat is stowed in its fully retracted configuration said shutters lie substantially parallel to each other to each side of said attachment means.

3. A wing leading edge arrangement according to claim 1 or 2 in which means are provided to urge said shutters, in moving said slat from said retracted configuration to said deployed configuration, to move progressively in parallel motion into an aperture engaging position.

4. A wing leading edge arrangement according to claim 1, wherein:
    said shutters are in the form of doors having a respective trailing edge and side webs;
    first articulated connection means connected to said side webs;
    wing riblets;
    second articulated connection means connected to said wing riblets;
    pivotal attachments and coaxial link members connected between said first and second articulated means; and
    tension spring means connected between said link members and fixed wing structure.

5. A wing leading edge arrangement according to claim 1, wherein the slat includes a lug protruding from the inner profile of the slat, a shaped rearward edge on said lug; and wherein:
    said shutters are in the form of doors having a respective trailing edge and side webs;
    first articulated connection means connected to said side webs;
    wing riblets;
    second articulated connection means connected to said wing riblets;

pivotal attachments and coaxial link members connected between said first and second articulated means; and tension spring means connected between said link members and fixed wing structure;

the arrangement being such that on retraction of the slat the said lug comes into progressive contact with said shutter doors against the resilient bias of said tension spring means.

* * * * *